United States Patent
Orozco Osorio

(10) Patent No.: US 8,127,716 B2
(45) Date of Patent: Mar. 6, 2012

(54) NIPPLE-TYPE POULTRY DRINKER

(76) Inventor: Edgar Orozco Osorio, Pereira (CO)

( * ) Notice: Subject to any disclaimer, the term of this patent is extended or adjusted under 35 U.S.C. 154(b) by 266 days.

(21) Appl. No.: 12/602,089

(22) PCT Filed: May 25, 2007

(86) PCT No.: PCT/IB2007/002243
§ 371 (c)(1),
(2), (4) Date: Nov. 25, 2009

(87) PCT Pub. No.: WO2008/146076
PCT Pub. Date: Dec. 4, 2008

(65) Prior Publication Data
US 2010/0175624 A1    Jul. 15, 2010
US 2011/0083611 A2    Apr. 14, 2011

(51) Int. Cl.
*A01K 7/00* (2006.01)
(52) U.S. Cl. .......................................... 119/75; 119/72.5
(58) Field of Classification Search .................... 119/72, 119/72.5, 75; 137/630.22
See application file for complete search history.

(56) References Cited

U.S. PATENT DOCUMENTS

| | | | | |
|---|---|---|---|---|
| 796,392 | A * | 8/1905 | Bailey | 137/630.22 |
| 3,669,077 | A * | 6/1972 | Spierenburg | 119/72.5 |
| 3,838,664 | A * | 10/1974 | Atchley | 119/72.5 |
| 5,660,139 | A * | 8/1997 | Hostetler | 119/72.5 |
| 6,619,231 | B2 * | 9/2003 | Darby et al. | 119/72 |
| 2004/0244705 | A1 | 12/2004 | Momont et al. | |

FOREIGN PATENT DOCUMENTS

| | | |
|---|---|---|
| CO | 279 | 4/1998 |
| ES | 159180 | 4/1971 |
| ES | 2054557 | 8/1994 |
| ES | 2094390 | 1/1997 |
| ES | 2156459 | 6/2001 |
| GB | 1295426 | 11/1972 |
| GB | 1420899 | 1/1976 |

OTHER PUBLICATIONS

VAL-CO People Products Solutions. Product brochure for Valco, 2009.
Ziggity Systems, Inc. Better performance of your laying hens, and drier pits. Product brochure for Ziggity Systems, Inc., May 6, 2008.
Avicorvi S.A. Water always clean and uncontaminated with Avicorvi's nipple. Product brochure for Avicorvi.

* cited by examiner

*Primary Examiner* — Monica Williams
(74) *Attorney, Agent, or Firm* — Alston & Bird LLP

(57) ABSTRACT

The invention relates to a nipple drinker formed by; a) the body of the nipple (1) which has multiple sections including an upper section formed by a dome (9) having a central circular groove (10), three hollow cylindrical sections (11) of different diameters, which are stepped one under another, and a lower frusto-conical section (12), the inner surface of which is provided with a small circular flange (13); a tubular pin (2) having a lower solid cylindrical portion (14); c) two spheres (3 and 6); d) two maximum-precision washers (4 and 7); e) a hollow, cylindrical inner seal holder (5), the upper outer portion of which is provided with a washer (15), leaving a space between the two portions of 0.3 mm, in which the washer (4) is housed; and f) a cylindrical outer seal holder (8), the lower portion of which is provided with a small frusta-conical section (16) that is inclined slightly by 17° towards the center.

20 Claims, 4 Drawing Sheets

NIPPLE-TYPE POULTRY DRINKER

TECHNICAL FIELD

The present patent application refers to a Nipple-Type Poultry drinker consisting in a device useful to deliver water to poultry when they activate the sphere protruding from the bottom part of the nipple, at the moment of drinking water.

BACKGROUND OF THE INVENTION

Different types of drinker are known in commerce, such as open system and close system. The open system, in which the water is directly in front of the poultry eyes, consist in a metallic container or plastic container when dealing with manual drinkers, having the mouth in an inverted position and on which there is a dish which delivers water in a dosing manner, when the poultry place their beak in the dish; with the disadvantage that the poultry soils the water with food, or frequently they return the drunk water into the dish thus contaminating the same. This type of drinker is referred to as bell type, channel type, can type etc.

There also are open type automatic drinkers in general bell type which receive the water directly from a water tank and deliver the water to poultry when ever needed. As it is an open system it is necessary to wash all at least once every day with the consequent problem of having personnel in and out constantly which besides molesting the poultry this can be a vehicle for poultry diseases.

The nipples correspond to the closed system and due to its design, the water in it cannot be soiled by the birds. The water that the poultry drink is that which the farmer gives them, which must be of excellent quality.

ADVANTAGES OF THE INVENTION

The nipple drinker subject matter of the present patent application has the following advantages: It is the only nipple-type drinker not having an outer pin activator. All other nipples have an outer pin which is activated by the peak of the birds but besides that in an involuntary manner with their comb, head, wings, thus producing more humidity in the poulterer's bed. This drinker carries two seals and two spheres made of high precision Stainless steel securing a dry bed. Using the same water column it delivers more water to poultry that any other nipple does, with no waste and no humidity. It requires less water column height and delivers a greater flow, which means there is no spilling when there is greater pressure, thus maintaining a dry floor.

BRIEF DESCRIPTION OF THE ANNEXED DRAWINGS

FIG. 1. Perspective exploding view of the Nipple drinker.
FIG. 2. Cross section view of the Nipple Drinker Assembly.
FIG. 3. A perspective view of the Nipple Body.
FIG. 4. Bottom view of the Nipple Drinker.
FIG. 5. Perspective view of the inner seal holder.
FIG. 6. Perspective view of the outer seal holder.

DESCRIPTION OF THE INVENTION

The Nipple Drinker, subject matter of the present patent application, as shown in FIGS. 1 and 2, comprises: a) a Nipple body (1); b) a pin (2); c) a sphere (3); d) a maximum-precision washer (4); e) an inner seal holder (5); e) a sphere (6); f) a maximum-precision washer (7); g) an outer seal holder (8).

The Nipple Body (1), as seen in FIG. 3, is comprised by various sections such as: a top section, formed by a semi-sphere (9) having a diameter of 7.45 mm, having a circular slot (10) at its center having a diameter of 3.15 mm; three hollow cylinder shaped sections (11) having different diameters, located each under the other in a staggered manner; and a lower frusto-conical section (12) with a top outer diameter of 12.35 mm and a bottom outer diameter of 16.70 mm, having a small circular flange (13) at a height of 6.23 mm, see FIG. 4. The nipple body (1) is made out of poly-acetal co-polymer, having a weight of 3 g and a height of 33 mm.

Pin (2) has a tubular shape with a lower cylinder part (14), it is solid and made of poly-acetal, having a weight of 0.18 g.

The spheres (3) and (5) bear a diameter of 0.635 cm and are made of stainless steel.

The maximum-precision washers (4) and (7) are made of stainless steel and have a outer diameter of 0.95 cm, an inner diameter of 0.57 cm, a thickness of 0.03 mm and a weight of 0.25 g.

The inner seal holder (5) has a hollow cylinder shape with a washer (15) located at the top outer part, such as shown in FIG. 5, with a 0.3 mm gap between the two parts, wherein the washer (4) fits in, and it is made of neoprene having a weight of 0.22 g.

The outer seal holder (8) has a cylinder shape having an outer diameter of 12.35 mm, as shown in FIG. 6, a thickness of 3.1 mm, bears in the bottom part a small frusto-conical section (16) having a height of 1.8 mm, a slight inclination towards the center of 17.43° determining an inner diameter of 7.45 mm and an outer diameter of 7.75 mm; it is made in poly-acetal co-polymer, which is a very strong material that will resist the continuous picking of the birds when activating the inner sphere (6), having a weight of 0.4 g.

The nipple drinker design allows a direct engaging to the tubing, in general PVC tubing of 1.27 cm or 1.9 cm which maintains available water for the birds.

Both the inner (5) and outer (8) seal holders, and both spheres (3) and (6) act in an independent manner, producing a double seal which stay closed thus preventing the water to flow while not activated by the birds.

When the bird acts on the stainless sphere (6) of the bottom part of the nipple with its peak, the movement of said sphere (6) immediately activates the second sphere located on the inner seal holder (5) in an independent manner and at the same time allows the water to flow which is now received by the birds.

The water flow passing by the nipple is regulated by the pin (2) located in the inner and top part of the same.

Figure 1:
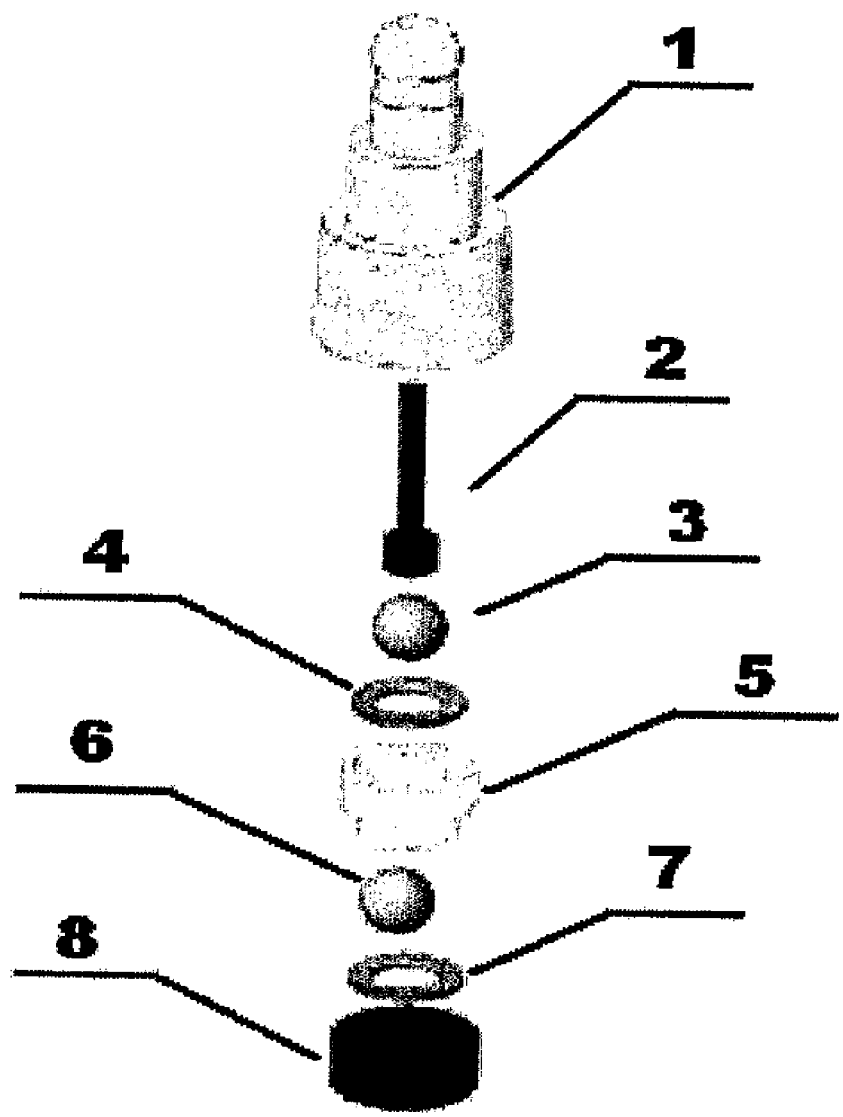
Figure 2:
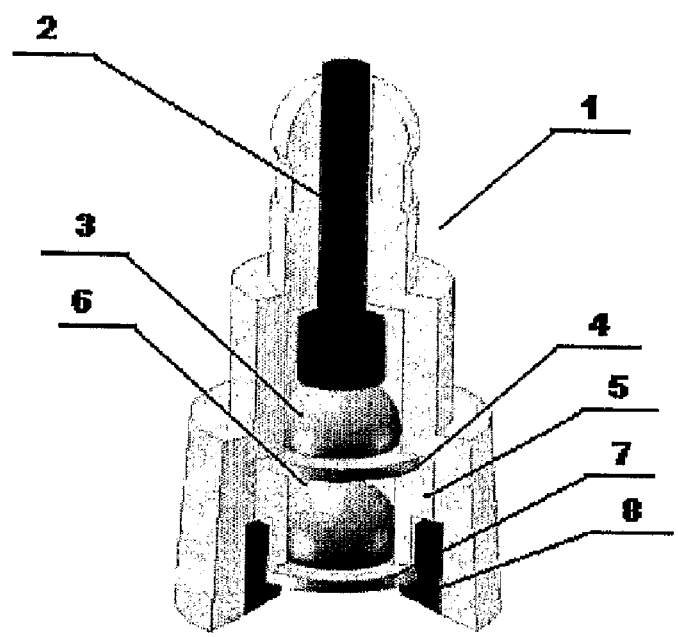
Figure 3:
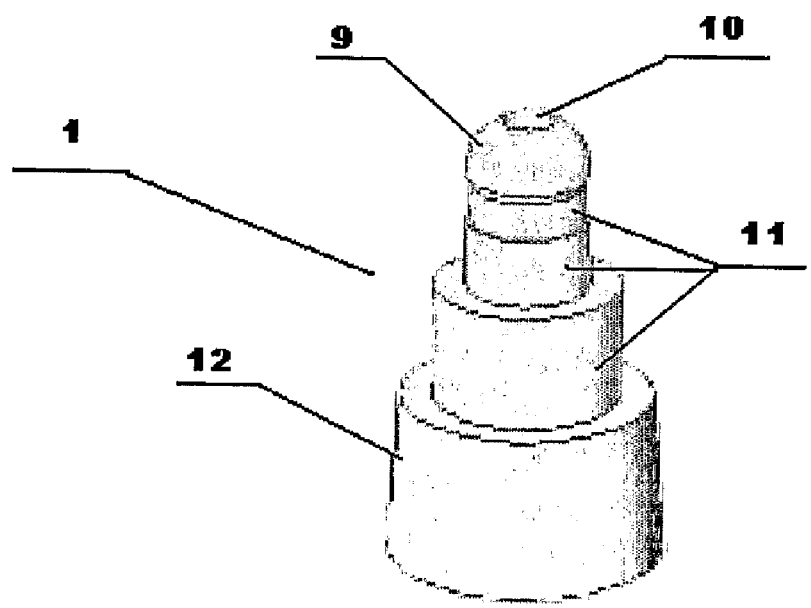
FIG. 3 is the perspective view of the nipple body and shows the nipple body (1), the top section, formed by a semi-sphere (9), the cylinder shaped sections (11) and the lower frusto-conical section (12).
Figure 4:
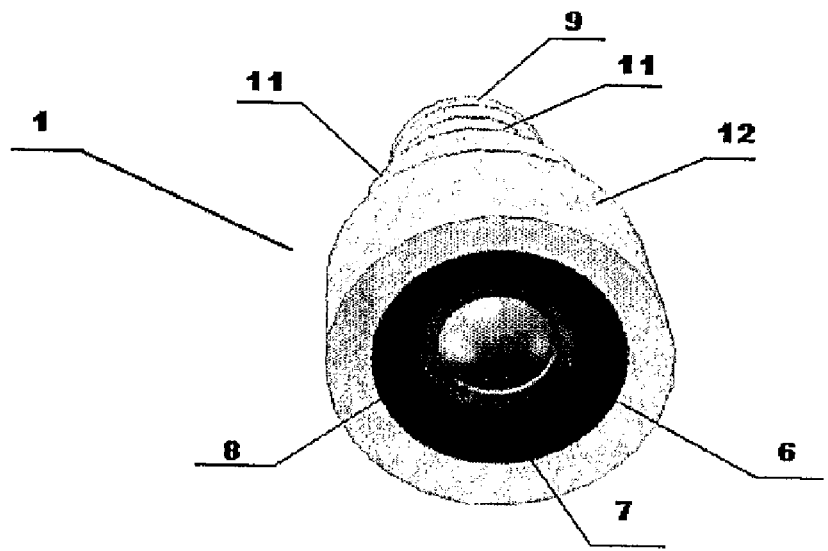
FIG. 4 shows the view of the bottom part of the nipple drinker comprised by: the nipple body (1), the sphere (6), the maximum-precision washer (7), the outer seal holder (8), the top section, formed by the semi-sphere (9), the cylinder shaped sections (11) and the lower frusto-conical section (12).
Figure 5:
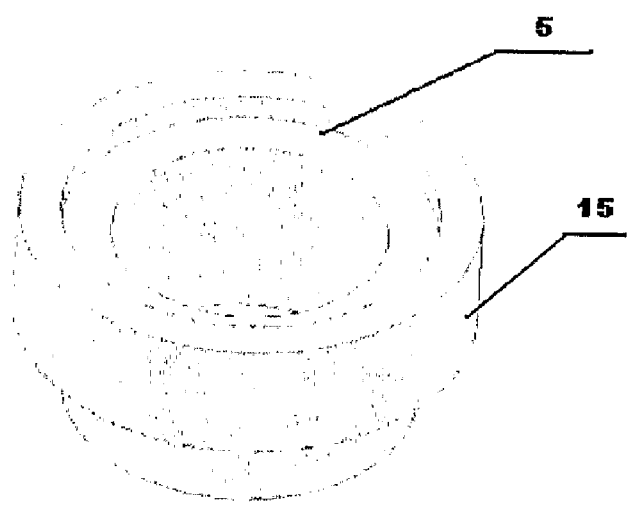
FIG. 5 shows the perspective view of the inner seal holder wherein one can see the shape of the inner seal holder (5) and the washer (15).
Figure 6:
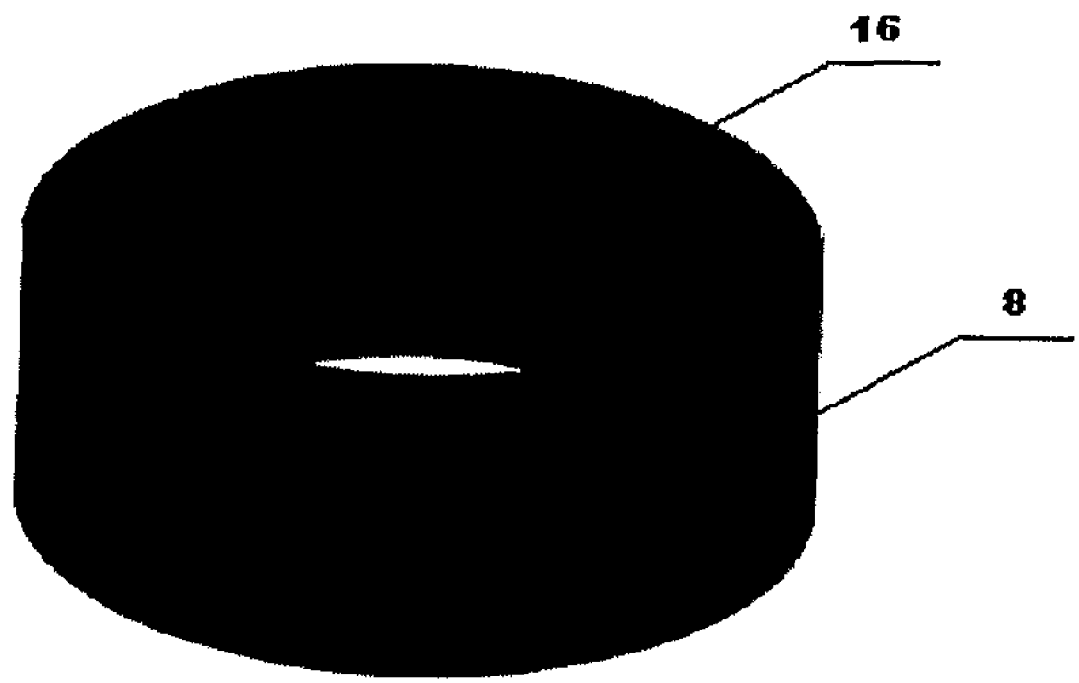
FIG. 6 shows the perspective view of the outer seal holder wherein it is shown the outer seal holder (8) with the small frusto-conical section (16).

What is claimed is:

1. A nipple drinker comprising:
   (a) a nipple body, comprising various sections including: a top section; three hollow cylinder shaped sections having different diameters, located each under the other in a staggered manner; and a lower frusto-conical section having on the inner surface a circular flange; wherein the top section of the nipple body is formed by a semi-sphere having at its center a circular slot;
   (b) a solid pin having a tubular shape with a lower cylinder part;
   (c) upper and lower spheres of the same size, which are separated by an inner seal holder having a hollow cylinder shape with a flange located at a top outer part, with a gap between the two parts, wherein a first maximum-precision washer is engaged within the gap; and
   (d) an outer seal holder having a cylinder shape, bearing in the bottom part a frusto-conical section having a slight inclination towards the center wherein a second maximum-precision washer is engaged.

2. The nipple drinker of claim 1, wherein the inner seal holder, the outer seal holder, and both spheres act in an independent manner producing a double seal, which stays closed when not activated by a bird, thus preventing water flow, and wherein when the bird acts upon the lower sphere with its beak, its movement immediately activates the upper sphere located on the inner seal holder in an independent manner and at the same time allows the water to flow to the bird.

3. The nipple drinker of claim 1, wherein the lower frusto-conical section of the nipple body has a top outer diameter of about 12 mm, and a bottom outer diameter of about 16.7 mm.

4. The nipple drinker of claim 1, wherein the circular flange of the lower frusto-conical section of the nipple body has a height of about 6 mm.

5. The nipple drinker of claim 1, wherein the upper and lower spheres have a diameter of about 0.635 cm.

6. The nipple drinker of claim 1, wherein the gap in the inner seal holder is about 0.3 mm.

7. The nipple drinker of claim 1, wherein the frusto-conical section of the outer seal holder has a height of about 1.8 mm.

8. The nipple drinker of claim 1, wherein the inclination of the frusto-conical section of the outer seal holder is about 17°.

9. The nipple drinker of claim 1, wherein the maximum-precision washers have an outer diameter of about 0.95 cm, an inner diameter of about 0.57 cm, and a thickness of about 0.03 mm.

10. The nipple drinker of claim 1, wherein the top section of the nipple body has a diameter of about 7.45 mm.

11. The nipple drinker of claim 1, wherein the circular slot of the top section of the nipple body has a diameter of about 3.15 mm.

12. The nipple drinker of claim 1, wherein the nipple body has a height of about 33 mm.

13. The nipple drinker of claim 1, wherein the outer seal holder is made of poly-acetal co-polymer.

14. The nipple drinker of claim 1, wherein the nipple body and pin are made of poly-acetal co-polymer.

15. The nipple drinker of claim 1, wherein the spheres and maximum-precision washers are made of stainless steel.

16. The nipple drinker of claim 1, wherein the inner seal holder is made of neoprene.

17. The nipple drinker of claim 1 that is designed to engage a tube of from about 1.27 cm to about 1.9 cm in diameter.

18. A nipple drinker comprising:
   (a) a nipple body, comprising various sections including: a top section; three hollow cylinder shaped sections having different diameters, located each under the other in a staggered manner; and a lower frusto-conical section with a top outer diameter of 12 mm and a bottom outer diameter of 16.70 mm, having on the inner surface a small circular flange at a height of 6 mm; wherein the top section of the nipple body is formed by a semi-sphere having at its center a circular slot;
   (b) a solid pin having a tubular shape with a lower cylinder part;
   (c) upper and lower spheres of the same size having a diameter of 0.635 cm, which are separated by an inner seal holder having a hollow cylinder shape with a flange located at a top outer part, with a 0.3 mm gap between the two parts, wherein a first maximum-precision washer is engaged within the gap; and
   (d) an outer seal holder having a cylinder shape, bearing in the bottom part a small frusto-conical section having a height of 1.8 mm and a slight inclination towards the center of 17° wherein a second maximum-precision washer is engaged.

19. The nipple drinker of claim 18, wherein the spheres and maximum-precision washers are made of stainless steel.

20. The nipple drinker of claim 19, wherein the outer seal holder is made of poly-acetal co-polymer.

* * * * *